Figure 1:
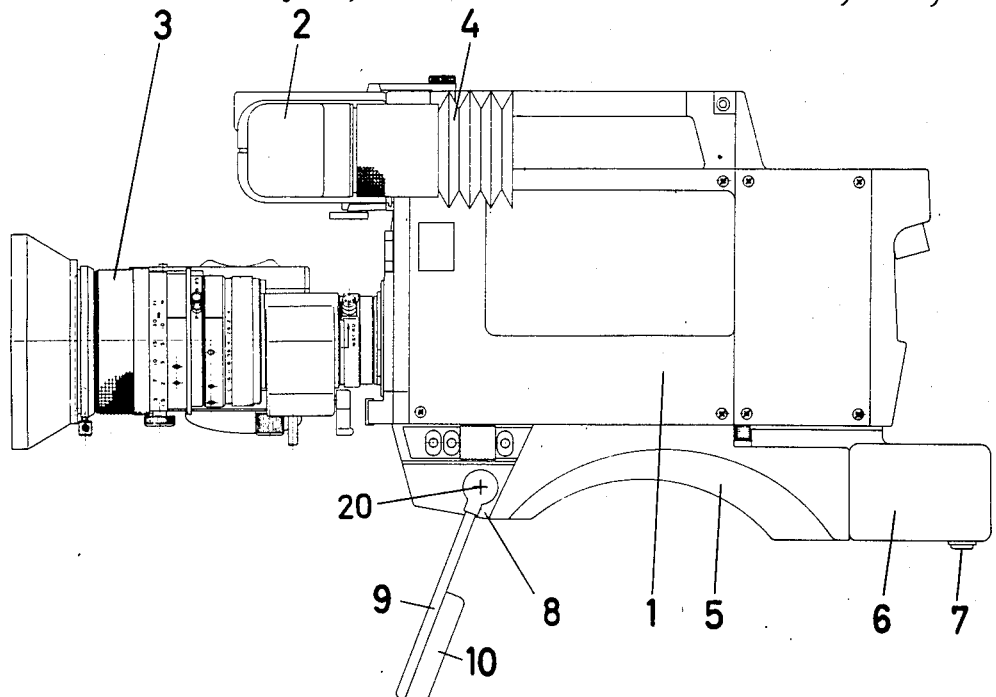

United States Patent [19]

Bachmann et al.

[11] Patent Number: 4,668,992
[45] Date of Patent: May 26, 1987

[54] PORTABLE TELEVISION CAMERA HAVING A CHEST SUPPORT LOCKABLE IN MULTIPLE POSITIONS

[75] Inventors: Horst Bachmann, Reinheim; Rudolf Wulf, Riedstadt, both of Fed. Rep. of Germany

[73] Assignee: Robert Bosch GmbH, Stuttgart, Fed. Rep. of Germany

[21] Appl. No.: 802,012

[22] PCT Filed: Apr. 10, 1985

[86] PCT No.: PCT/DE85/00110

§ 371 Date: Nov. 7, 1985

§ 102(e) Date: Nov. 7, 1985

[87] PCT Pub. No.: WO85/05166

PCT Pub. Date: Nov. 21, 1985

[30] Foreign Application Priority Data

Apr. 28, 1984 [DE] Fed. Rep. of Germany ....... 3415898

[51] Int. Cl.[4] ............................................. G03B 17/02
[52] U.S. Cl. ...................... 358/229; 354/82; 352/243
[58] Field of Search .................. 358/229, 909; 354/81, 354/82, 293; 352/34, 197, 243

[56] References Cited

U.S. PATENT DOCUMENTS 2,711,122  6/1955  Klumpp ................................ 354/82
4,083,480  4/1978  Lee et al. ............................ 358/229

FOREIGN PATENT DOCUMENTS 0441148  2/1927  Fed. Rep. of Germany ...... 354/293
1134207  8/1962  Fed. Rep. of Germany ...... 354/293
0711527  1/1980  U.S.S.R. ............................. 352/243

Primary Examiner—Gene Z. Rubinson
Assistant Examiner—Stephen Brinich
Attorney, Agent, or Firm—Michael J. Striker

[57] ABSTRACT

A portable television camera is provided, whereby a shoulder support is mounted on the camera housing. This shoulder support includes a U-shaped yoke which is mounted at both sides of the camera housing and which is selectively usable as a chest support or as a stand-up support. If need be, a flexible cushion may be clamped into the yoke and its position is adjustable in a number of locking positions.

4 Claims, 3 Drawing Figures

PORTABLE TELEVISION CAMERA HAVING A CHEST SUPPORT LOCKABLE IN MULTIPLE POSITIONS

STATE OF THE ART

The invention is based on a portable television camera in accordance with the type of the main claim. A portable television camera is already known from DE-OS 31 13 373, wherein the assembly position of such parts which assure an exhaust free carrying and which are essential for a comfortable handling can be exchanged in a simple manner. These are specific arrangements for an alternate use by right handed or left handed persons. Furthermore, the DE-OS 31 17 217 describes carrying aids or carrying supports for portable television cameras, wherein a base part with mounted shoulder support is provided for being mounted on the lower section of a portable television camera housing. The shoulder portion may be foldable and the removable handle of the television camera can be removed from the camera housing and can be mounted on a front section of the base part of the shoulder support. The television camera described in the aforementioned DE-OS represents an improvement of the problem which occurs when the view finder eyepiece displaces with respect to the eye of the user by the selective mounting of a shoulder support.

ADVANTAGES OF THE INVENTION

The portable television camera with the characterizing features of the main claim is advantageous with respect thereto, in that it also could be used as a stationary camera without dismantling the parts required for its handling. As a further advantage it is to be considered that these parts can be simply adjusted.

Due to the measures stated in the subclaims advantageous further embodiments and improvements of the television camera stated in the main claim are made possible. It is particularly advantages that the device parts which are pivoted out of the way are mounted lost free when the camera is operated as a stationary camera.

DRAWING

Figure 2:
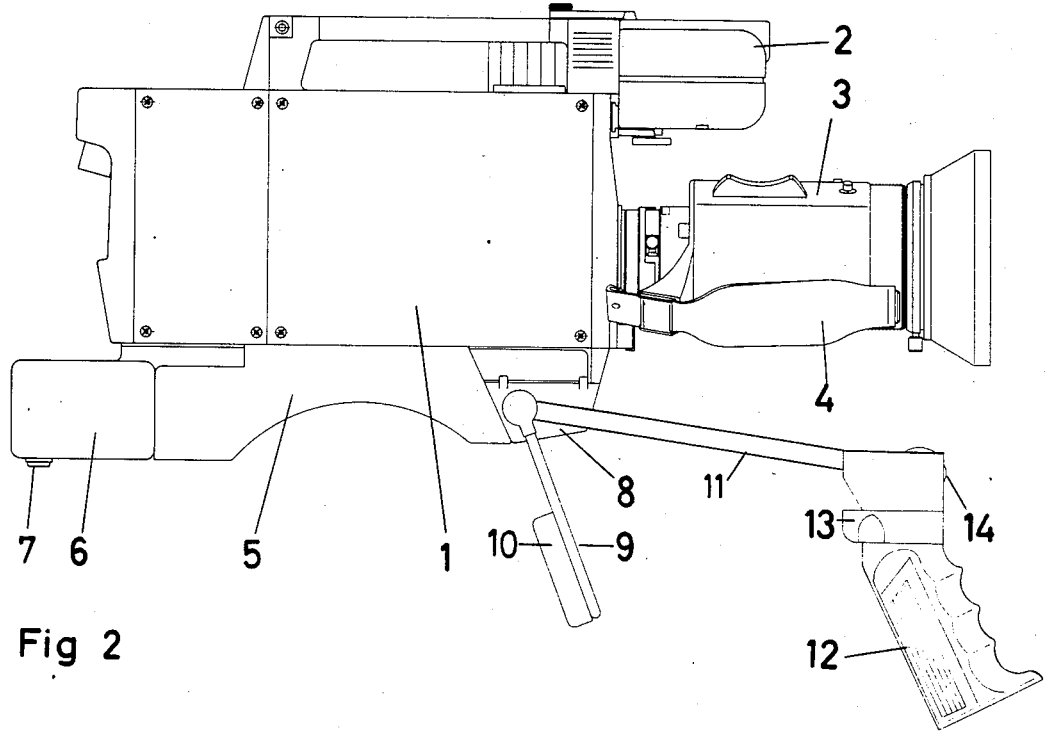
Figure 3:
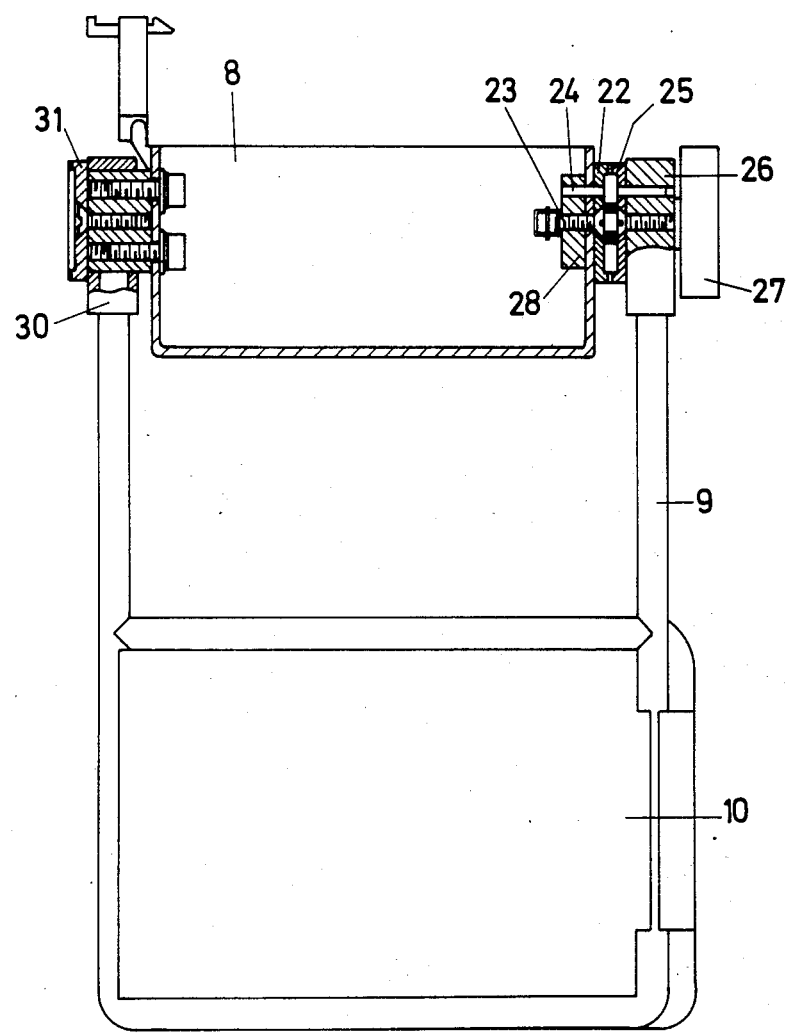

Exemplified embodiments are illustrated in more detail in the subsequent description. The drawings show:

FIG. 1 a television camera in accordance with the invention in a side view,

FIG. 2 a nother embodiment of the television camera, also in a side view,

FIG. 3 the front view of a support yoke being connectable with the television camera.

DESCCRIPTION OF THE EXEMPLIFIED EMBODIMENT

The portable television cameras illustrated in FIGS. 1 and 2 have the same basic housing 1 with the mounted viewfinder 2, they are merely equipped with different lenses 3 or 4. The portable camera in accordance with FIG. 1 shows in a side view from the left the foldable eye piece viewing hood for the electronic viewfinder 2. Both device embodiments rest on the shoulder of the operator on a flexible shoulder support 5. Both embodiments are provided with the battery box 6 at the rear end of shoulder support 5 extending transversely to the optical axis of the camera and is provided with two support faces 7 at each end.

A U-shaped yoke 9 has two arms which are pivotably mounted at both sides of a rigid trough-shaped front part 8 of the shoulder support 5. A chest cushion 10 is clamped on the pivotable yoke 9 for supporting the camera during use. The structure and the mode of operation of yoke 9 will be described in the following in conjunction with FIG. 3. The portable television camera in accordance with FIG. 2 is also provided with handle being mounted on a support rod which also may contain some operating elements for the camera operation as indicated at 13,14.

In the embodiment in accordance with FIG. 3, the yoke 9 with the clamped on chest cushion 10 is illustrated in a front view. The mounting of the yoke 9 on the front part 8 of the shoulder support 5 is performed in such a manner that the yoke 9 is adjusted with a number of graduation steps around the (assumed) rotating axis 20 and can then be set. For this purpose a tooth segment 22 is provided on part 8 and mounted by means of a screw 23 being secured against twisting by the cylinder pin 24. A similar tooth segment 25 is rotatably mounted in the lug 26 of the yoke. The positive locking between the two tooth segments 22,25 can be realized and the yoke 9 can be pivoted against part 8 by means of the toggle 27, whose thread spindle extends into a corresponding thread bore of mounting part 28. After tightening the toggle 27 the two tooth segments 22,25 are again positively locked with respect to each other and the yoke 9 is locked in its desired position. For reasons of weight, the yoke 9 is advantageously made from a light metal alloy, whose flexibility is sufficient to neutralize the positive locking of the two tooth segments 22,25 when releasing the toggle 27. The yoke 9 is rotatably mounted in a hollow bored lug 30 on the opposite side of pan 8. A further tooth segment 31 serves to pivotably mount the operating handle 12. For this purpose a further tooth segment (not shown) is mounted on a support rod which analog to the toggle 27 for mounting the yoke is also positively connected with the tooth segment 31 by means of a further toggle.

The particular advantage of the described camera construction results from the fact that the parts, like chest support and operating handle which are adjusted to an optimum position on the shoulder for operating the camera can be used in a simple manner for the operation as a stand up camera or can be folded back for storing and can be pivoted back into an operating position without requiring a long adjusting operation.

We claim:

1. Portable television camera comprising a camera housing, a shoulder support secured to a lower side of the camera housing, said support having a rigid front part and a flexible intermediate part, a U-shaped yoke whose arms are rotatably mounted at both lateral sides of said rigid front part, and locking means provided between said rigid front part and said arms to lock said yoke in a plurality of angular positions relative to said camera housing.

2. Portable television camera in accordance with claim 1, further comprising a flexible chest cushion which is clamped into the U-shaped yoke.

3. Portable television camera as defined in claim 1 wherein said locking means include a tooth segment secured to an arm of said yoke, an opposite tooth segment secured to said front part, and a hand-operated toggle provided with a spindle for locking said segments one with the other.

4. Portable television camera as defined in claim 1 further comprising an elongated battery box attached to a rear end of said shoulder support and extending transversely to an optical axis of the camera.

* * * * *